March 14, 1950 C. S. JEWETT 2,500,359
SHAFT SEAL
Filed July 26, 1947
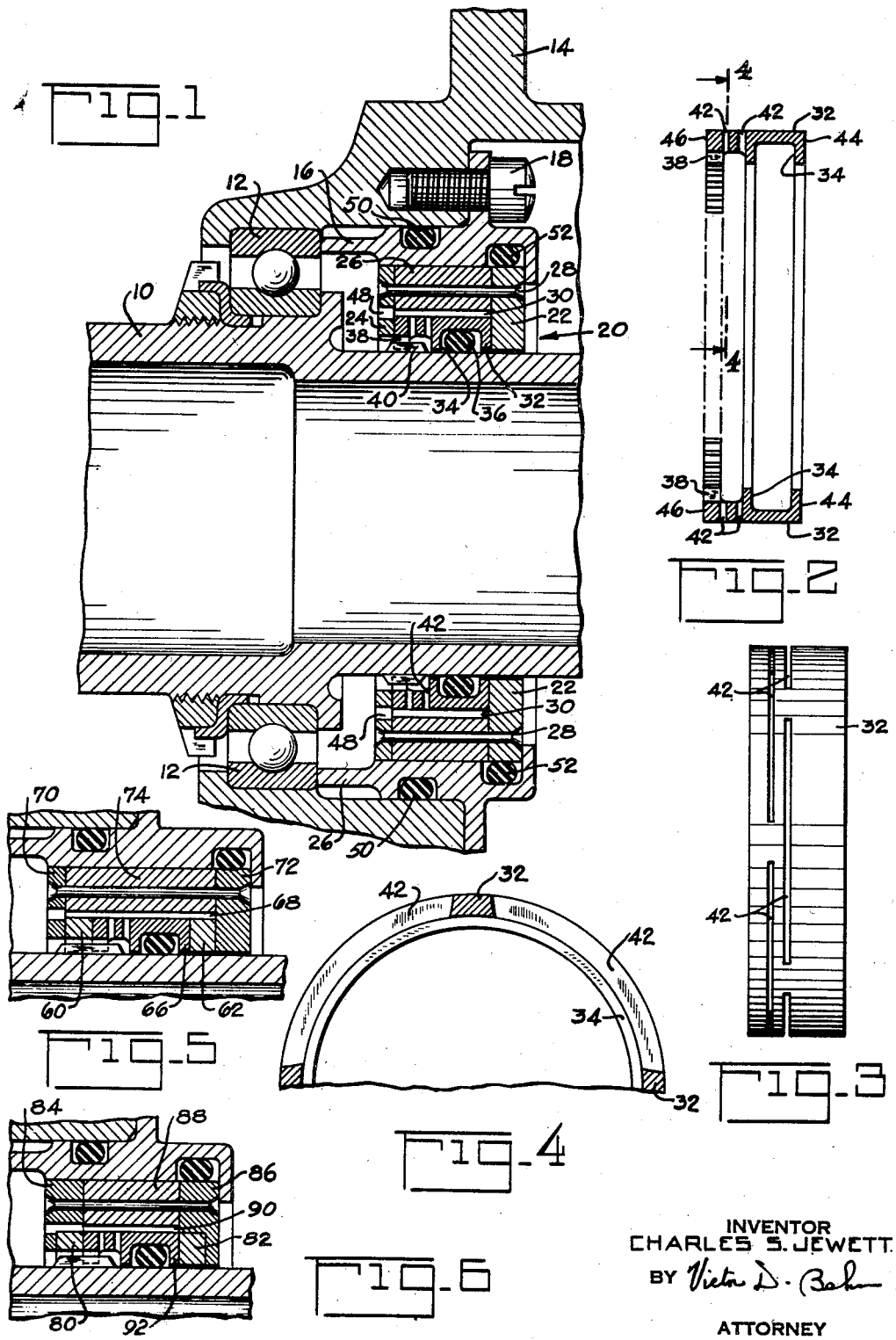
INVENTOR
CHARLES S. JEWETT.
BY
ATTORNEY Patented Mar. 14, 1950

2,500,359

UNITED STATES PATENT OFFICE 2,500,359

SHAFT SEAL

Charles S. Jewett, Upper Saddle River, N. J., assignor to Wright Aeronautical Corporation, a corporation of New York Application July 26, 1947, Serial No. 763,906

1 Claim. (Cl. 286—8)

This invention relates to fluid seals for rotating shafts and particularly directed to a shaft seal which is effective at high shaft speeds as well as at zero shaft speed and at intermediate speeds.

In general a "face-type" seal is the only type of seal which has proved capable of withstanding high operating rubbing speeds—for example in the neighborhood of 200′ per second. By a "face-type" seal is meant one in which the seal is provided by the engagement of relatively rotatable flat or substantially flat surfaces. In the past the operation of most face-type seals has not always been satisfactory. Thus, in apparently identical face-type seals, some would operate satisfactorily for years, others would quickly burn out and still others would leak from the start. It is believed that this difference in the operation of supposedly identical seals has in part resulted from differences in the contact pressures on the seal faces. For example, in many installations the spring rate of the seal is sufficiently high that the axial manufacturing tolerances in the installation and the axial float of the shaft makes it impossible to insure that the contact pressure on the seal faces is within a satisfactory range. In addition in some installations the seal contact pressures change with variations in the pressure of the fluid being sealed or with the ambient air pressure.

An object of this invention comprises the provision of a novel face-type seal in which the aforementioned difficulties of the prior art face-type seals has been eliminated. A further object of the invention comprises the provision of a face seal for a shaft in which the face seal is completely drip-proof and the face seal contact pressure does not vary in installation or during operation of the seal and said pressure can be precisely determined during its manufacture.

Specifically the invention comprises a seal ring disposed about a shaft and disposed within an annular channel rigid with a housing structure through which said shaft extends, said ring providing a face seal with one wall of said channel. In addition said ring is drivably connected to said shaft by means permitting relative axial movement therebetween and a gasket is disposed between said ring and shaft.

Other objects of the invention will become apparent upon reading the annexed detail description in connection with the drawing, in which:

Figure 1 is a sectional view of an installation embodying the invention;

Figure 2 is an enlarged sectional view of the seal ring incorporated in Figure 1;

Figure 3 is an elevational view of Figure 2;

Figure 4 is a sectional view taken along line 4—4 of Figure 2; and

Figures 5 and 6 are sectional views similar to Figure 1 but of modified forms of the invention.

Referring to the drawing, a shaft 10 is journaled within a bearing 12 supported within a fixed housing structure 14 through which said shaft extends. The bearing 12 is held in said housing structure by an annular retainer ring 16 secured thereto by screws 18. The housing structure 14 may comprise a portion of the crankcase of an internal combustion engine from which the shaft 10 extends for driving an accessory of said engine. Obviously, however, the invention is not limited to this specific application.

In order to prevent leakage of lubricating oil or other liquid out of the housing 14 along the shaft 10, a seal assembly 20 is disposed about said shaft. The seal assembly 20 comprises end rings 22 and 24 and a spacer ring 26 secured together by rivets 28. The spacer ring 26 has an internal diameter substantially larger than that of the end rings 22 and 24 to provide an annular channel 30 therebetween within which a seal ring 32 is disposed.

The channel structure, comprising the rings 22, 24, and 26, is suitably secured to the retainer ring 16—as by a shrink fit—to form an integral structure with said retainer ring and housing 14. A shrink-fit is provided therebetween by forming the rings 22, 24, and 26 with an external diameter slightly larger than the internal diameter of the retainer ring 16. Then the retainer ring 16 is heated and/or the assembled rings 22, 24, and 26 are cooled sufficiently to permit insertion of said assembled rings within the retainer ring 16. Thereupon said temperature difference is removed to provide a so-called shrink-fit between the retainer ring 16 and the rings 22, 24, and 26.

The seal ring is disposed within the annular channel 30 before the rings 22, 24, and 26, forming said channel, are assembled or riveted together, so that said seal ring 32 is disposed about the shaft 10. One end of the seal ring 32 is provided with an internal groove 34 within which an annular packing 36 is disposed to provide a seal between said ring 32 and the shaft 10. The other end of the ring 32 is provided with internal splines 38 meshing with external splines 40 on the shaft 10. In this way the ring 32 is positively driven by the shaft 10 so that there is no relative rotation between the said packing 36 and the surfaces engaged thereby, about the axis of the shaft 10. Also this axial spline connection between the ring 32 and the shaft 10 permits relative axial movement of said ring 32 and shaft 10.

The rings or annular members 22, 24, 26, 32 and 36 are all circumferentially continuous, that is, said rings are not split like a piston ring. Such non-split rings are hereinafter termed "continuous" rings. With the split-type seal rings of the prior art, there necessarily is a small amount of leakage between the split ends of the seal ring or rings. However, with the present invention, said continuous ring construction renders the seal completely drip-proof.

The gasket 36 within the groove 34 preferably comprises an annular ring of rubber or other resilient rubber-like material with said gasket ring having a free external diameter larger than the internal diameter of the groove 34 and having a free internal diameter smaller than the external diameter of the shaft 10 about which said ring is disposed. By "free diameter" of the rubber ring 34 is meant its diameter when no external forces are applied thereto (except of course for gravitational effects). Accordingly when the gasket ring 36 is disposed within the groove 34 about the shaft 10, said ring is in radial compression, thereby providing a fluid-tight seal between the shaft 10 and seal ring 32. In addition the axial width of the gasket ring 36 when disposed in the groove 34 about the shaft 10, preferably is smaller than the width of said groove.

The ring 32 is also provided with a plurality of sets of circumferentially extending slots 42, each said slot extending only part-way about the circumference of the ring. Two sets of slots 42 are illustrated in the drawing. The slots of each set are disposed in a plane transverse to the axis of its ring and axially spaced from the plane of the slots of the other set. In addition the slots of one set are circumferentially staggered relative to the slots of the other set so that the ring material between adjacent slots on one set are bridged by the slots of the other set and vice versa. This slotted ring construction provides the ring with an axial elasticity which holds the end faces 44 and 46 of the ring 32 tightly against the lapped end walls or surfaces of the channel 30. That is, the slotted portion of the ring 32 acts as a spring bearing against one side wall of the channel 30 for urging the end face 44 of said ring into contact with the adjacent wall of the channel 30 to provide a face seal therebetween. The slots 42 provide a spring construction whose characteristics can be accurately reproduced.

With the above construction the seal ring 32 is disposed about the shaft 10 between the end walls of the channel 30, said walls being rigid with the housing 14 through which the shaft 10 extends. In addition the axial elasticity or spring construction of the ring 32 holds its end faces 44 and 46 against the adjacent walls of the channel 30. The engagement of the seal ring 32 holds its end faces 44 and 46 against the adjacent walls of the channel 30. The engagement of the seal ring face 44 with the adjacent wall of the groove 30 provides a face seal preventing leakage between the housing 14 and the ring 32. The contact pressure between each end face 44 and 46 of the seal ring 32 and the channel wall engaged thereby is controlled by the axial length of the seal ring 32 prior to insertion of the ring 32 within the groove 30, and by the axial length of the spacer ring 26. Obviously these two dimensions can be controlled very accurately, that is said dimensions can be held within very small manufacturing tolerances, so that said contact pressures can be accurately fixed at the desired value within a small range determined by said manufacturing tolerances. Also because the seal ring 32 is substantially axially free of the shaft 10, variations in the axial position of the shaft do not appreciably change the contact pressures on the end faces 44 and 46 of the seal ring 32. That is, the effectiveness of said face seal is independent of the axial position of said shaft.

The gasket 36 prevents leakage between the seal ring 32 and the housing 14. Because of the splined driving connection from the shaft 10 to the seal ring 32, there is no relative rotation between the gasket ring 36 and the surfaces engaged thereby, about the axis of said shaft. Accordingly there is little or no wear of the gasket 36.

The combination of the gasket 36 with the face seal provided by the continuous seal ring 32 provides a drip-proof seal between the shaft 10 and the housing 14 when the shaft is stationary and as well as when the shaft is rotating, and the effectiveness of the combination seal is independent of the axial position of the shaft 10. In operation, lubricating oil or other fluid being sealed flows from the housing 14 past the splines 38 and then radially outwardly through the slots 42 to the annular space at the bottom of the channel 30 about the ring 32. A plurality of drain holes 48 are provided in the ring 24 to permit oil to flow out through said holes back into the housing from said annular space. This flow of oil through the ring slots 44 and over the outer surface of the ring 32 helps to carry away the heat created by the rubbing friction between the end faces of the seal ring 32 and the adjacent walls of the channel 30. This circulation of oil results at least partly from oil being thrown radially outwardly from the slots 42 by the centrifugal forces acting thereon.

A gasket 50 may be provided between the retainer ring 16 and the adjacent wall of the housing 14, and a gasket 52 may be provided between said retainer ring and the end ring 22. However, the gaskets 50 and 52 form no part of the present invention and if desired they may be similar to the gasket 36.

Preferably the seal ring 32 is made of material—such as cast iron—having a low modulus of elasticity so that it has a low spring rate. The rings 22, 24, and 26 may be made of a suitable steel. Also, in order to permit a further increase in the relative speeds of the face seal surfaces without causing scuffing of these surfaces, suitable rings of material—such as carbon or bronze—having low scuffing characteristics may be interposed as illustrated in Figures 5 and 6.

In Figure 5 a pair of floating rings 60 and 62 are interposed between the end faces of a seal ring 66 and the side walls of a channel 68 formed by end rings 70 and 72 and a spacer ring 74. The rings 60 and 62 are made of suitable material such as carbon or bronze having low scuffing properties relative to the surfaces engaged thereby.

Figure 6 is similar to Figure 5 except the antiscuffing rings 80 and 82 are suitably bonded or secured to the end rings 84 and 86 in annular channels in said end rings. A spacer ring 88 is disposed between said end rings, to form a channel 90 within which a seal ring 92 is disposed. With this construction of Figure 6 the composite surface formed by each end ring and its antiscuffing ring may be finished flat as illustrated, so that as in Figure 1 the contact pressure of the face seal is controlled by the axial length of the seal ring 92 and the axial length of the spacer ring 88. In the construction of Figure 5 the axial length of the anti-scuffing rings 60 and 62 must also be considered in determining the face seal contact pressures thereby increasing the range of the face seal contact pressures resulting from the manufacturing tolerances.

While I have described my invention in detail in its present preferred embodiments, it will be obvious to those skilled in the art, after understanding my invention, that various changes and modifications may be made therein without departing from the spirit or scope thereof. I aim in the appended claim to cover all such modifications.

I claim as my invention:

An assembly for providing a seal between a housing member and a shaft-like member rotatable relative to and extending through said housing member: said assembly comprising means rigid with one of said members and having an annular channel facing the other of said members; a continuous ring disposed in said channel and axially splined to said other member so as to substantially prevent relative rotation and to permit relative axial movement therebetween, said ring having an annular groove facing said other member; an annular gasket of rubber-like material disposed in said groove, said gasket, when disposed in said groove, having an axial width less than the width of said groove, said gasket also having a free external diameter larger than the internal diameter of the bottom portion of said groove engaged by said gasket and having a free internal diameter smaller than the external diameter of the portion of said other member engaged by said gasket, said ring also having a circumferentially slotted portion between the portion of said ring engaging said gasket and the end of said ring adjacent the side of said housing member from which the liquid to be sealed tends to leak, said slotted portion providing said ring with an axial elasticity urging the end faces of said ring toward engagement with the end walls of said channel to provide a face seal at the end of said ring remote from said housing member side; and drain passageways establishing communication between the bottom of said channel and said housing member side.

CHARLES S. JEWETT.

REFERENCES CITED

The following references are of record in the file of this patent:

UNITED STATES PATENTS

| Number | Name | Date |
| --- | --- | --- |
| 1,869,933 | Cooke | Aug. 2, 1932 |
| 2,393,779 | Hunter | Jan. 29, 1946 |
| 2,411,509 | Endebak | Nov. 26, 1946 |
| 2,433,839 | Ferguson et al. | Jan. 6, 1948 |

FOREIGN PATENTS

| Number | Country | Date |
| --- | --- | --- |
| 200,371 | Great Britain | of 1923 |